E. T. YOUNG.
SOAPSTONE EQUIVALENT.
APPLICATION FILED JUNE 29, 1920.
1,391,037.
Patented Sept. 20, 1921.
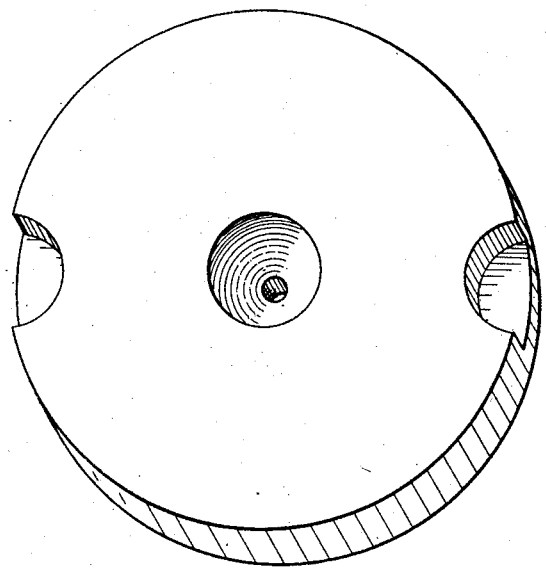
Inventor
Everett Townsend Young
By Attorney

UNITED STATES PATENT OFFICE.

EVERETT TOWNSEND YOUNG, OF PEEKSKILL, NEW YORK.

SOAPSTONE EQUIVALENT.

1,391,037.

Specification of Letters Patent.   Patented Sept. 20, 1921.

Application filed June 29, 1920. Serial No. 392,791.

*To all whom it may concern:*

Be it known that I, EVERETT TOWNSEND YOUNG, a citizen of the United States, and resident of Peekskill, in the county of Westchester and State of New York, have invented a certain new and useful Soapstone Equivalent, of which the following is a specification.

This invention relates to substances as steatite and kaolins and has for its object a substitute for steatite or soapstone wherever steatite is employed as a heat retainer, as for culinary and baking utensils, heating blocks and linings for self-cookers, and like purposes.

The object is attained by the means set forth in this specification, and the accompanying drawing illustrates one means of applying the invention.

The illustration is of a circular block made for heating self-cooker combinations. The central depression and the notches in the edge are to adapt the block to supports made for it in the cooker. The illustration shows that the combination of refractory kaolins is susceptible of being molded into forms to suit situations and conditions.

Soapstone as used for heating purposes is expensive to put into forms, is more or less brittle and subject to breakage in transportation, and by reason of the water which is one of its constituent parts, it is liable to explosion at high temperatures.

This invention overcomes all these drawbacks, producing a hard, compact, strong, dry mass that possesses all the heat retaining qualities of soapstone, and is comparatively inexpensive to manufacture.

The blocks or forms are molded in desired shapes from a plastic combination comprising clay known as Edgar's ball clay and pulverized fire brick or "fire brick grog". The grog is ground to a particular fineness and is thoroughly incorporated with the ball clay.

The composition is made up of equal quantities of No. 9 Edgar's ball clay and fire brick grog ground to No. 15 mesh screen, and the forms are fired to cone No. 7, or 2318° F.

I claim:

1. Blocks for self-cookers composed of a kaolin blended with a pulverized fired kaolin and fired at a high temperature, having the heat retaining qualities of soapstone.

2. A molded and fired composition comprising equal parts of Edgar's ball clay and fire brick grog at No. 15 mesh screen and fired at a temperature of 2318° F.

3. Heat retaining forms having the heat retaining qualities of soapstone, composed of Edgar's ball clay and fire brick grog, and fired at a high temperature.

EVERETT TOWNSEND YOUNG.